Patented Apr. 10, 1945

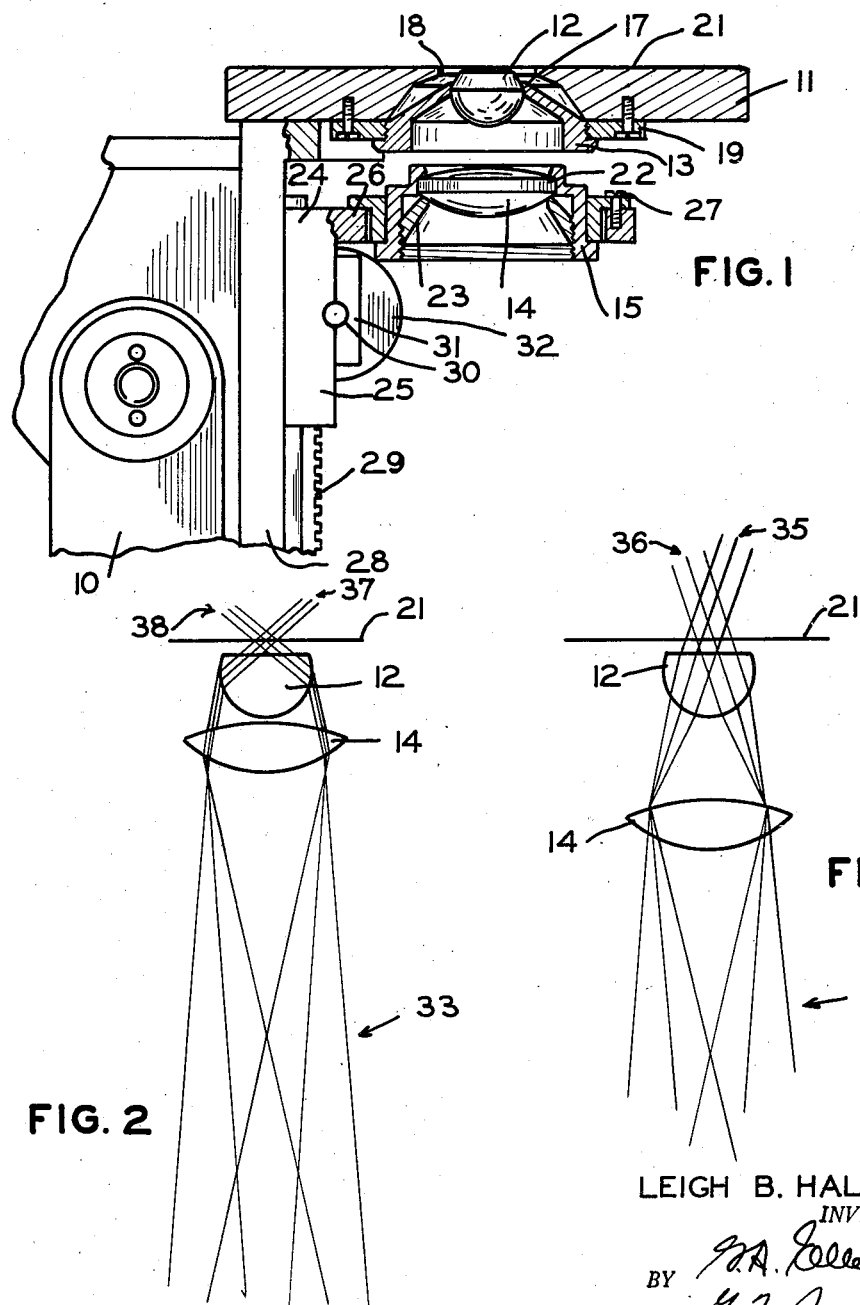

2,373,559

UNITED STATES PATENT OFFICE 2,373,559

ILLUMINATING DEVICE

Leigh B. Hall, Rochester, N. Y., assignor to Bausch & Lomb Optical Company, Rochester, N. Y., a corporation of New York Continuation of application Serial No. 348,087, July 29, 1940. This application March 17, 1943, Serial No. 479,474

2 Claims. (Cl. 88—40)

This invention relates to optical instruments and more particularly to a microscope having a novel substage illuminating device.

This application is a continuation of my previously filed application Serial #348,087, filed July 29, 1940.

In microscopy where higher magnifications are desired in the study of an object, it is necessary to employ a condenser for illuminating the object. For proper illumination the condenser should transmit just sufficient light to fill the back lens and the field of the objective being employed. If by reason of the condenser used too large a field is covered, "glare" and "fogging" results with attendant impairment of perfect observation conditions, while if the field is too small the borders will, of course, not be visible.

A criteria allowing the selection of a proper condenser for use with a particular objective resides in the relation existing between the aperture characteristics of condensers and objectives, namely, the numerical aperture or N. A. which is employed for rating lens means of this type. As is well known, a condenser having an N. A. like that of a chosen objective may be designed to transmit sufficient light to just completely fill the field of the objective. The size of such field, it is to be pointed out, is in general related to the size of the N. A. of the objective, the former becoming larger as the N. A. becomes smaller.

As objectives of different magnifying powers have different numerical apertures it is necessary to employ a particular condenser with each particular objective used in order to secure optimum performance. For this reason objectives and condensers are generally furnished in matched pairs. This association of paired objectives and condensers raises two serious difficulties to the practice heretofore employed by the prior art in connection with microscope design.

One such difficulty resides in the fact that condensers are expensive and that a set of even a limited number is relatively costly.

The other difficulty arises from the fact that it is often necessary to study an object under both low and high power magnifications, necessitating one or more changes of condensers and objectives. Although it is a comparatively simple matter to change an objective, due to the construction expedient of mounting a plurality of different objectives in a revolving nosepiece, such is not the case when making a condenser change. In changing to a different objective carried by the nosepiece it is only necessary to swing such objective into operating position by revolving the nosepiece. On the other hand, in order to prevent interference with facile adjustment and manipulation of the microscope, it is customary to detachably mount a single condenser in a lens holder carried on a vertically slidable mount supported on the microscope stand. Although some microscopes have been designed with a plurality of condensers which could be separately moved into operative position as the objective was changed such instruments have not proven successful as it was still necessary to buy a plurality of costly condensers and the rotating condenser mount interfered with the use of the instrument.

To obviate the necessity of employing a condenser for each objective it has been proposed to add to the condenser an auxiliary or additional lens system, generally a pancratic system. These systems are expensive and have not been adopted generally and most microscopes today are designed to detachably mount a single condenser as heretofore described and a condenser change may be effected only by performing the necessary steps of racking down the lens holder, removing the condenser therefrom, inserting a new condenser into the holder, and then racking up the holder to move the new condenser into operative position. Such procedure is involved and tedious, and the cause of frequent interruptions to the observations of a microscopist.

It is possible to mount an iris diaphragm beneath a standard condenser and through adjustment of the diaphragm regulate the size of the N. A. of the condenser. However, such a procedure does not vary the size of the field of view on the specimen and hence fails to be satisfactory over a very large range of objective magnifications. A condenser thus modified generally fills too much field for the higher powers, resulting in a breakdown of the contrast of the image at these powers. Such an arrangement is actually satisfactory for only one objective and is at best but a compromise.

The instrument of the present invention obviates not only the expense of obtaining a number of condensers for use with the plurality of objectives of the instrument but also eliminates the time consuming operation of changing the condenser for each change of objective. The condenser of the instrument of the present invention may be employed for properly illuminating a plurality of objectives of different characteristics, for the focus of the same is variable, and means are associated therewith for selectively adjusting the focus of the same.

In the broader aspect of the present invention the condenser may comprise a plurality of relatively adjustable lens means for changing the focus of the condenser, but in the preferred embodiment of the present invention the condenser is formed with a stationary front lens and a separate back lens, the latter being movable along the optical axis of the condenser into different operating positions with respect to the front lens. In the embodiment of the invention illustrated, the front lens is fixedly mounted within the opening in the microscope stage and the back lens supported by a carrier on a substage slide member employed to support the condenser and operated by a coarse adjustment mechanism for focusing the condenser.

Thus many different sized apertures for the condenser may be obtained by adjusting the back lens in different locations along the optical axis of the condenser. Accordingly the condenser of the present invention not only provides effective but also extremely simple and inexpensive means so that a single condenser may be used to properly illuminate a plurality of different objectives.

Other objects and advantages of the present invention will appear from the following description taken in connection with the accompanying drawing in which:

Fig. 1 is a fragmentary view of a microscope embodying my invention with parts of the instrument illustrated in section.

Fig. 2 is a diagrammatic view illustrating the operation of the condenser when the holder for the back lens is in its uppermost position adjacent to the stage.

Fig. 3 diagrammatically discloses the operation of the condenser when the back lens is at the lowermost position and most distant from the front lens of the condenser.

The microscope with which the illumination device of the present invention is used comprises, referring now to Fig. 1, the usual stand 10 supporting the stage or object support 11. The condenser of the present invention comprises a front lens 12 mounted in a front lens holder 13 and a back lens 14 mounted in a lens holder 15 which is separate from the front lens holder and is located below the stand. The front lens 12 is retained in its holder by spinning over the edge of the holder against the lens as indicated at 17. The stage 11 is provided with an enlarged tapered opening 18 and the lens holder 13 extends within this opening and is held therein by a mounting ring 19 secured to the under surface of the stage 11. It will be noted that by this construction the front lens is rigidly mounted in the opening in the stage 11 or is stationary with respect thereto.

To permit the surface of the lens 12 to be placed in contact with the underside of an object slide the upper surface of the front lens 12 is preferably spaced slightly below the level of the upper or supporting surface 21 of the stage 11.

The lens holder 15 mounting the double convex lens 14 is separate from the front lens holder and is not connected thereto. This holder is provided with a lens seat 22 against which the back lens 14 is held by means of the screw threaded retaining ring 23. The lens holder is supported by arm 24 attached to the movably mounted slide member 25 carried on the microscope stand 10. The arm 24 is provided with an opening within which the lens mounting element or suitably split ring 26 is secured by the screws 27 or other securing devices. The back lens holder 15 may be detachably held within the mounting ring by frictional engagement, or if desired, may be otherwise secured thereto.

The slide 25 which is of the usual construction is moved on a guide 28 on the microscope stand by means of a rack 29 formed on the face of the guide and a pinion not shown secured on the shaft 30 rotatably supported in the bearing 31 on the slide member itself. Operation of the rack and pinion so as to move the slide to any desired vertical position and hence elevate or lower the back lens of the condenser is effected by suitable rotation of the hand wheel 32.

To be noted is the fact that the back lens holder is mounted and maintained in optical alignment with the front lens of the condenser and is also movable along the optical axis of the front lens, which axis is also the optical axis of both lenses and consequently the optical axis of the condenser itself.

Moreover, it will be appreciated that movement of the back lens will vary the focal length of the condenser. With each change of focus of the condenser there is also a change in size or area of the field illuminated. As it is possible to change the size or area of the field illuminated, it is possible to adjust the back condenser lens for each particular objective employed so as to illuminate a field of a size approximating the size of the field of the chosen objective, or, in other words, I am able to provide a condenser having an N. A. which may be adjusted to approximate the N. A. of anyone of a plurality of objectives having different N. A.'s.

It is evident that in the broadest aspects of the present invention the back lens 14 could be fixed and the front lens 12 movably mounted for adjustment along the optical axis of the condenser. Thus the stage itself to which the front lens 12 would be rigidly mounted, could be movable relative to the back lens. The operation of the illustrated form of the condenser of the present invention will be well understood from an inspection of Figs. 2 and 3 of the drawing. In Fig. 2 the condenser is shown in a normal operating condition with the back lens 14 in its most elevated location. Any suitable source of diffused light is employed for illumination and it will be appreciated that rays of light emanating therefrom will strike the under surface of the back lens 14 at many different points on the surface thereof and at many different angles of incidence. Many of these rays, due to their angle of incidence, will be lost in the system but on the other hand certain of them, namely, the rays 33 which may be taken as diverging cones of light emanating from the light source used and which define the area of the light source which will be effective in illuminating the condenser field will be passed by the condenser.

The relative position of the two lenses as shown in Fig. 2 is analogous to the usual prior art condenser wtih a back lens and a front lens fixedly mounted in a single condenser holder at a fixed and predetermined distance from each other. Like the prior art condensers the lenses 12 and 14 when in the position shown in Fig. 2 will provide an illuminating device which will illuminate a particular size field and which will have a particular N. A.

To change to a condenser having a smaller N. A. or one capable of illuminating a greater field than that illustrated in Fig. 2, the focus of the condenser of Fig. 2 is varied by lowering the back lens 14 along the optical axis of the condenser through actuation of the hand wheel 32 to cause the rack and pinion adjusting mechanism to move the slide 25 downwardly. That a change in the size of the field will occur when the focus of the condenser is varied by lowering the back lens 14 will be apparent from an examination of Fig. 3 wherein the back lens 14 is illustrated in its lowermost position and located at a point on the optical axis of the condenser which is displaced downwardly from its position as shown in Fig. 2. In Fig. 3 rays of light 34 from a source of diffused light such as was contemplated in Fig. 2 are like the rays 33 in that they represent the limiting rays which define or determine the area of the light source which is effective in illuminating the condenser field. The rays 34 also are to be considered as emanating from the same points on the light source as the rays 33. However, due to the change of focus of the condenser brought about by the new position of the back lens, the rays will strike the lens 12 at greater distances apart than the rays shown in Fig. 2 and will define an illuminated area on the specimen of a greater size than the field illuminated in the position of the lenses as shown in Fig. 2.

In Figs. 2 and 3 it has been demonstrated that the condenser will illuminate different sized fields as the lens 14 is adjusted relative to the lens 12 and the rays shown are indicative not only of the field, but also of the N. A. In Fig. 3 where the field is larger the N. A. is smaller as indicated by the smaller divergence of the beams 35 and 36 as compared with the beams 37 and 38 of Fig. 2. This fact corresponds with the manner in which the objectives are made since, as is well known, the higher N. A. objectives are correspondingly higher powered and hence cover a smaller field.

It will now be understood that with an increase in size of the field there is also a decrease in the size of the N. A. due to the relationship existing between these characteristics of the condenser. Thus many different sized numerical apertures for the condenser may be obtained by adjusting the position of the back lens along the optical axis of the condenser. With each position of the back lens, it is not possible to obtain critical illumination inasmuch as the condenser, except in the relative position of the lenses as shown in Fig. 2 will not form a real image of the light source in the plane of the specimen to be examined. The condenser, nevertheless, can be satisfactorily employed with a number of different objectives, each of which has a different N. A.

To the end of simplifying the drawing I have shown a condenser having only a single front and a single back lens element. Obviously the invention may be equally well performed when using a condenser having a greater number of lens elements, the only requirement being that suitably fixed movable lens means be utilized. Similarly, it will be realized by those skilled in the art that either an uncorrected or corrected condenser may be employed with my invention. My invention may be employed for either bright or dark field illumination, as the front lens holder 13 can be easily detached and a dark field element may be substituted in place of the front lens shown. If preferred, a suitable dark field stop could be detachably mounted in a suitable holder below the back lens.

From the foregoing it will be appreciated that the variable focus condenser which I have disclosed provides not only an effective but also an extremely simple and inexpensive means permitting use of the single condenser to properly illuminate a plurality of objectives having different characteristics. Furthermore, the position of the back lens can be adjusted without interfering with the adjustment and manipulation of the other working parts of a microscope with which the device of the present invention may be employed.

While I have shown and described a preferred embodiment of my invention it is to be understood that the invention is not to be limited to the details of construction shown, but is susceptible of changes in form and detail within the scope of the appended claims.

I claim:

1. A microscope having in combination a stand, a stage carried by the stand, said stage having an aperture, a condenser mounted below the stage for illuminating an object carried by the stage above the aperture, said condenser comprising a plurality of lens means constituting the sole means for condensing light rays, means for fixedly securing a part of said lens means within the aperture in said stage, a sub-stage movably carried by the stand for vertical movement beneath the stage, means on the sub-stage for holding the remainder of said lens means with the optical axes of all of the lens means coincident, and means carried by the stand for moving the sub-stage and associated lens means vertically whereby the size of the field illuminated by the condenser may be selectively varied.

2. A microscope having in combination a stand, a stage carried by the stand, said stage having an aperture, mounting means secured within said aperture, a refracting lens element carried by the mounting means, a sub-stage bracket movably carried by the stand below the stage, said sub-stage having an opening, a second refracting lens element mounted in said opening, the axes of the two elements being coincident, said elements forming a condenser and constituting the sole means for condensing the light rays for illuminating an object placed on the stage over the aperture, and means for vertically moving said sub-stage and the second refracting lens element whereby the size of the field illuminated by the condenser may be selectively varied.

LEIGH B. HALL.